US008763070B2

(12) United States Patent
Cozart et al.

(10) Patent No.: US 8,763,070 B2
(45) Date of Patent: Jun. 24, 2014

(54) ELECTRONIC TRANSACTIONS SYSTEM (75) Inventors: Dennis Cozart, Scottsdale, AZ (US);
Lorcan McGuinness, Sioux Falls, SD
(US); Michael Peterson, Phoenix, AZ
(US)

(73) Assignee: Blackboard Inc., Washington, DC (US)

( * ) Notice: Subject to any disclaimer, the term of this patent is extended or adjusted under 35 U.S.C. 154(b) by 696 days.

(21) Appl. No.: 12/476,136

(22) Filed: Jun. 1, 2009

(65) Prior Publication Data
US 2010/0263018 A1    Oct. 14, 2010

Related U.S. Application Data (60) Provisional application No. 61/167,849, filed on Apr. 8, 2009.

(51) Int. Cl.
*G06F 21/00*  (2013.01)
*G06F 21/31*  (2013.01)

(52) U.S. Cl.
CPC ..................................... *G06F 21/31* (2013.01)
USPC .................................................. 726/1; 726/21

(58) Field of Classification Search
CPC ....................................................... G06F 21/30
USPC ................................................................ 726/1
See application file for complete search history.

(56) References Cited

U.S. PATENT DOCUMENTS

| 5,675,782 | A  | * | 10/1997 | Montague et al. ............... 726/4 |
| 5,970,475 | A  | * | 10/1999 | Barnes et al. .............. 705/26.35 |
| 6,032,130 | A  | * | 2/2000  | Alloul et al. ............... 705/14.34 |
| 6,105,027 | A  | * | 8/2000  | Schneider et al. ................... 1/1 |
| 6,314,196 | B1 | * | 11/2001 | Yamaguchi et al. .......... 382/125 |
| 2004/0230536 | A1 | * | 11/2004 | Fung et al. ...................... 705/64 |
| 2008/0133303 | A1 |   | 6/2008  | Singh et al. |
| 2008/0306872 | A1 |   | 12/2008 | Felsher |
| 2008/0319907 | A1 |   | 12/2008 | Russell et al. |

* cited by examiner

*Primary Examiner* — Gilberto Barron, Jr.
*Assistant Examiner* — Devin Almeida
(74) *Attorney, Agent, or Firm* — McDermott Will & Emery LLP (57) ABSTRACT A system for processing electronic transactions according to policies is disclosed. The system includes a user module configured to store computer-readable information related to a user, and a policy module configured to store a plurality of policies for electronic transactions. Each policy for an electronic transaction includes a permission to access a physical space or item by a user. The system also includes a processor configured to receive a request to complete an electronic transaction by the user, and configured to dynamically apply, upon receipt of the request by the processor, the plurality of policies to the user based on the request to complete the electronic transaction. Methods and machine-readable mediums are also disclosed.

19 Claims, 5 Drawing Sheets

ELECTRONIC TRANSACTIONS SYSTEM

CROSS-REFERENCE TO RELATED APPLICATIONS

The present application claims the benefit of priority under 35 U.S.C. §119 from U.S. Provisional Patent Application Ser. No. 61/167,849 entitled "Policy Implementation for Electronic Transactions," filed on Apr. 8, 2009, the disclosure of which is hereby incorporated by reference in its entirety for all purposes.

BACKGROUND

1. Field

The present disclosure generally relates to systems and methods for the processing of electronic transactions, and specifically, to the processing of electronic transactions using policy rules.

2. Description of the Related Art

The ability of educators, including educational institutions, private corporations, and institutions of higher learning, to reach potential students has generally been limited by geography. The advent of networked computers and communications has afforded a partial solution to these limitations. In particular, the widespread use and availability of electronic networks such as the Internet and the World Wide Web have made it possible for students and educators to overcome geographic dispersion and physical location as a barrier to education.

Many educational institutions offer network-based role-based access control (RBAC) systems available through these electronic networks that provide users access to different information, items, and areas based on those users' roles. Such systems allow a user to interact with the educational system in a number of different ways. For example, a user having a student role can purchase a textbook at a cash register connected to the network in the institution's bookstore, but will not be able to purchase an instructor's edition. As another example, a user having an alumnus role can access his transcript information via a web browser connected to the network. As a further example, a user having an instructor role can access a file room restricted by an access card device connected to the network. Each of these different users is associated with roles that correspond to their individual and often unique access levels. These roles are static, because if a role does not currently exist that matches a user's access needs, a new type of role must be created for the user. For example, if a user is a student at an institution but is also an instructor for certain courses, then a new role that combines both the access privileges of a student role and an instructor role must be created for that user. For institutions that have many users with varying access needs, the requirement of creating new role types for users can be burdensome.

Furthermore, institutions having several departments often have interface techniques that are greatly variable, based on personal preference and the subject matter being provided. Network-based systems that do not provide for a significant degree of customization are ill suited to address this need to accommodate diverse modes in a single system.

SUMMARY

According to certain embodiments of the present disclosure, the disclosed systems and methods deal generally with the implementation of policies in electronic transactions, allowing multiple policies associated with different access levels to be applied dynamically to a user based upon the changing access level needs and profile of the user. Consequently, instead of creating a static new access role for each user that requires a different level of access from previously existing users in the network-based system, different policies may be dynamically applied to users in the system based on the access level needs and profile of the user to determine the user's access. These policies are applied when access is attempted.

In certain embodiments of the disclosure, a system for processing electronic transactions according to policies is provided. The system includes a user module configured to store computer-readable information related to a user, and a policy module configured to store a plurality of policies for electronic transactions. Each policy for an electronic transaction includes a permission to access a physical space or item by a user. The system also includes a processor configured to receive a request to complete an electronic transaction by the user, and configured to dynamically apply, upon receipt of the request by the processor, the plurality of policies to the user based on the request to complete the electronic transaction.

In certain embodiments of the disclosure, a system for processing electronic transactions according to policies is provided. The system includes a user module configured to store computer-readable information related to a user, and a policy module configured to store plurality of policies for electronic transactions. Each policy for an electronic transaction includes information indicating a price and an availability of an item to the user in a financial transaction. The system also includes a processor configured to receive a request to complete an electronic transaction by the user, and configured to dynamically apply, upon receipt of the request by the processor, the plurality of policies to the user based on the request to complete the electronic transaction.

In certain embodiments of the disclosure, a system for processing electronic transactions according to policies is provided. The system includes a user module configured to store computer-readable information related to a user, and a policy module configured to store plurality of policies for electronic transactions. Each policy for an electronic transaction includes information indicating a change in at least a portion of an electronic educational user interface between the system and the user at a policy execution point (PEP). The system also includes a processor configured to receive at least one of a request from the user to complete an electronic transaction, or a command for the user to complete an electronic transaction, and configured to dynamically apply, upon receipt by the processor of the request to complete the electronic transaction or command to complete the electronic transaction, the plurality of policies to the user based on at least one of the request to complete the electronic transaction or the command to complete the electronic transaction.

In certain embodiments of the disclosure, a method for processing electronic transactions according to policies is provided. The method includes receiving at least one of a request from a user to complete an electronic transaction, or a command for the user to complete the electronic transaction. The method also includes dynamically applying, upon receipt of the request to complete the electronic transaction or command to complete the electronic transaction, a plurality of policies to the user based on at least one of the request to complete the electronic transaction or the command to complete the electronic transaction. A policy for the electronic transaction includes information indicating a change in at least a portion of an electronic educational user interface displayed to the user.

In certain embodiments of the disclosure, a machine-readable medium encoded with instructions for processing electronic transactions according to policies is provided. The instructions include code for receiving at least one of a request from a user to complete an electronic transaction, or a command for the user to complete the electronic transaction. The instructions also include dynamically applying, upon receipt of the request to complete the electronic transaction or command to complete the electronic transaction, a plurality of policies to the user based on at least one of the request to complete the electronic transaction or the command to complete the electronic transaction. A policy for the electronic transaction includes information indicating a change in at least a portion of an electronic educational user interface displayed to the user.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

There is a problem, in network based systems that provide access to users based on their roles, of creating a new role for each user that requires a different level of access from previously existing users. This and other problems are addressed and solved, at least in part, by embodiments of the present disclosure, which include a system for processing electronic transactions according to policies is provided. The system includes a user module configured to store computer-readable information related to a user, and a policy module configured to store a plurality of policies for electronic transactions. Each policy for an electronic transaction includes a permission to access a physical space or item by a user. The system also includes a processor configured to receive a request to complete an electronic transaction by the user, and configured to dynamically apply, upon receipt of the request by the processor, the plurality of policies to the user based on the request to complete the electronic transaction.

With reference to the drawings, which are provided by way of exemplification and not limitation, there are disclosed embodiments for processing electronic transactions according to policies. As discussed and used interchangeably herein, a policy is a rule that defines a choice in the behavior of a system. Policies may be created, deleted, modified, or otherwise affected in order to dynamically change the strategy for managing the system and hence modify the behavior of the system, without changing the system's underlying implementation.

Figure 1:
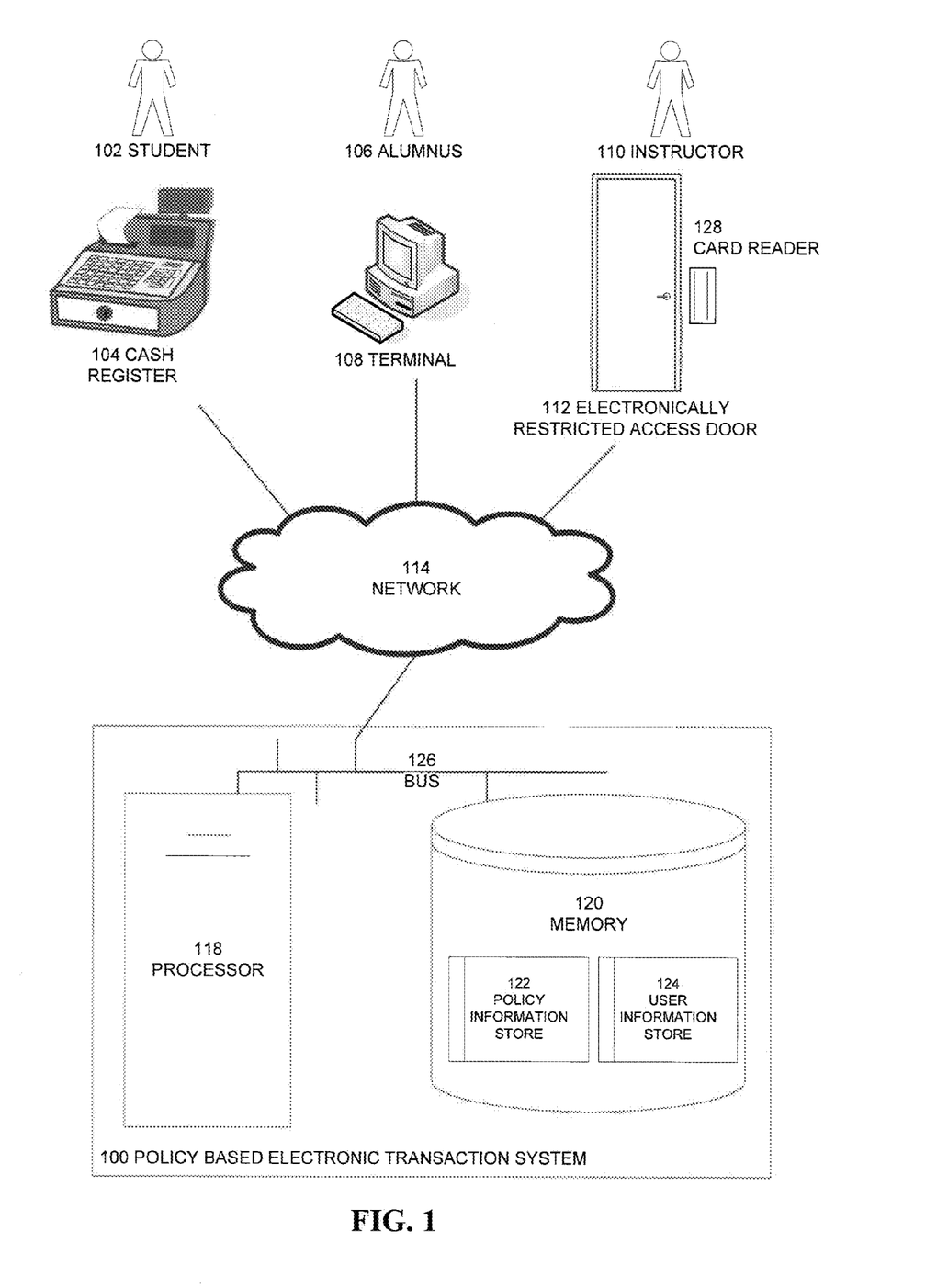
FIG. 1 is a diagram illustrating a policy-based electronic transaction system.

FIG. 1 is a diagram illustrating a policy-based electronic transaction system 100 (hereinafter "policy system 100"). The policy system 100 includes a processor 118, communications bus 126, and memory 120. The computer-readable memory 120 includes a policy information store 122 and a user information store 124.

The policy system 100 is configured to communicate over a network 114 (e.g., a packet-based network such as the Internet, or some other suitable network) with any number of policy execution points (PEP), such as a cash register 104, a terminal 108, and an electronically restricted access door. As discussed herein, the terminal 108 is a type of computer system. In certain embodiments, the policy system 100 is implemented in a client-server network topology. In the illustrated embodiment, three users, a student 102 (e.g., a student at an educational institution having low level access and student-type policies associated with his electronic profile), an alumnus 106 (e.g., an alumnus of the educational institution having alumnus-type policies associated with his electronic profile), and an instructor 110 (e.g., an instructor at the educational institution having high level access and instructor-type policies associated with her electronic profile) seek to use one of the PEP clients. Each of the PEPs 104, 108, and 112 can communicate with the policy system using a standard Internet interface including, but not limited to, TCP/IP, HTTP, SMTP, and FTP running on a standard computing platform such as a personal computer or workstation. For example, terminal 108 can include a shell service servlet that uses the URL-encoded information contained in HTTP requests received from a web browser on the terminal 108.

Using processor 118, the policy system 100 is configured to apply policies stored in policy information store 122 to events (or "electronic transactions") received from a PEP. Specifically, in certain embodiments, the processor 118 is configured to receive either a request from a user to complete an electronic transaction, or a command for the user to complete the electronic transaction, and the processor 118 is configured to apply a policy to the user based on either the request to complete the electronic transaction or the command to complete the electronic transaction.

For example, in the event where instructor 110 seeks to gain access through the electronically restricted access door 112 by sliding an identification card through the card reader 128 of the electronically restricted access door 112, the information associated with the event is sent from the electronically restricted access door 112 card reader 128 over the network 114 to the communications bus 126 of the policy system 100. The bus 126 communicates the event information to the processor 118. The processor 118 is configured to retrieve the instructor's 110 information from the user information store 124, and the policies applicable to the instructor 110 based on the instructor's 110 information from the user information store 124. The processor 118 is configured to apply the applicable policies to the instructor's information to determine whether the instructor has the right to access the electronically restricted access door 112, and the policy system 100 sends the determination to the electronically restricted access door 112. The electronically restricted access door 112 then either provides access to the instructor 110 or does not provide access to the instructor 110 based on the determination.

In certain embodiments, the policy information store 122 is configured to store policies for electronic transactions. Electronic transactions can include, for example, a request or command for permission to access a physical space or item by a user, a request or command for a price and an availability of an item to the user, or a request or command for determining at least a portion of an electronic educational user interface (e.g., generating an interface for a web browser). These are only examples, as there are many other examples of electronic transactions.

In certain embodiments, policies are defined according to a subject value, action value, target value, and domain value. The subject value is the user, the action value is the action performed by the subject, the target value is the target (e.g., item or physical space) associated with the subject's action, and the domain value indicates the group in which policy can be applied. In certain embodiments, policies can also be defined to include an initiator, which indicates who or what starts or initiates the action performed by the subject.

In certain embodiments, policies can be combined or otherwise associated in groups, such as for the purposes of policy organization and reusability. In certain embodiments, a policy-role can provide a semantic grouping of policies within a common subject, generally pertaining to a position within an organization, such as an instructor or administrator. A policy-role can include any number of policies, groups, or meta-policies, as discussed in further detail below. In certain embodiments, a first policy can inherit from a second policy, such as by allowing the first policy to inherit some or all of the parts or rules of the second policy.

Policies can be, for example, authorization policies (e.g., access control) or obligation policies. In certain embodiments, policies can include one or more constraints, as described in further detail below. Authorization policies are concerned with limiting the activity of users who are registered with the system. Authorization policies include permissions, where a subject can perform an action, and prohibitions, where a subject cannot perform an action. In certain embodiments, authorization policies can include information filtering and delegations. Authorization policies define what actions a subject can perform on a target, and can be both positive and negative. An exemplary authorization policy for permission can indicate whether the student 102 is authorized to purchase particular textbooks at the cash register 104. Information filtering transforms the information input or output from an action. An exemplary authorization policy for information filtering can indicate that the instructor 110 has access to obtain address information for students, but that the student 102 does not have access to obtain address information for students. Delegation is used to transfer access rights temporarily. An exemplary authorization policy for delegation policy can indicate that an instructor 110 can temporarily delegate his access privileges to assign grade information to another user, such as the instructor's assistant.

Obligation policies specify the actions that must be performed by users when certain events occur, and provide the ability to respond to changing circumstances. Obligation policies include refrain policies. For example, an obligation policy can indicate sending an alert to a security officer (not illustrated) when the electronically restricted access door 112 is opened without authorization and must be closed. The user (the security officer, in this example) is required to take the action (closing the door) specified by the exemplary obligation policy. A refrain policy defines certain actions that users are not allowed to perform on targets even though they may otherwise be generally allowed to perform those types of actions. An exemplary refrain policy can indicate that the alumnus 106 is not allowed to change the year of graduation associated with his profile, while the alumnus 106 is generally allowed to change other personal information associated with his profile, such as his address.

Policy constraints include a condition or set of conditions under which a policy is valid. An exemplary basic policy constraint evaluates to true for the policy to apply, such as, for example, a time policy constraint in which a policy is valid only during certain time periods, e.g., the student 102 can purchase items from the cash register 104 only during the hours of 9:00 AM to 9:00 PM. An exemplary meta-policy constraint specifies policies about policies within a composite policy or other scope, such as, for example, a policy that there should be no policy authorizing the instructor 110 to provide the student 104 with access privileges to the electronically restricted access door 112.

Certain embodiments of the policy system 100 disclosed herein can be integrated in or otherwise used with the Internet-based education support system and methods disclosed in U.S. patent application Ser. No. 11/648,096, titled "Internet-Based Education Support System and Methods," which is incorporated in its entirety herein by reference.

Figure 2:
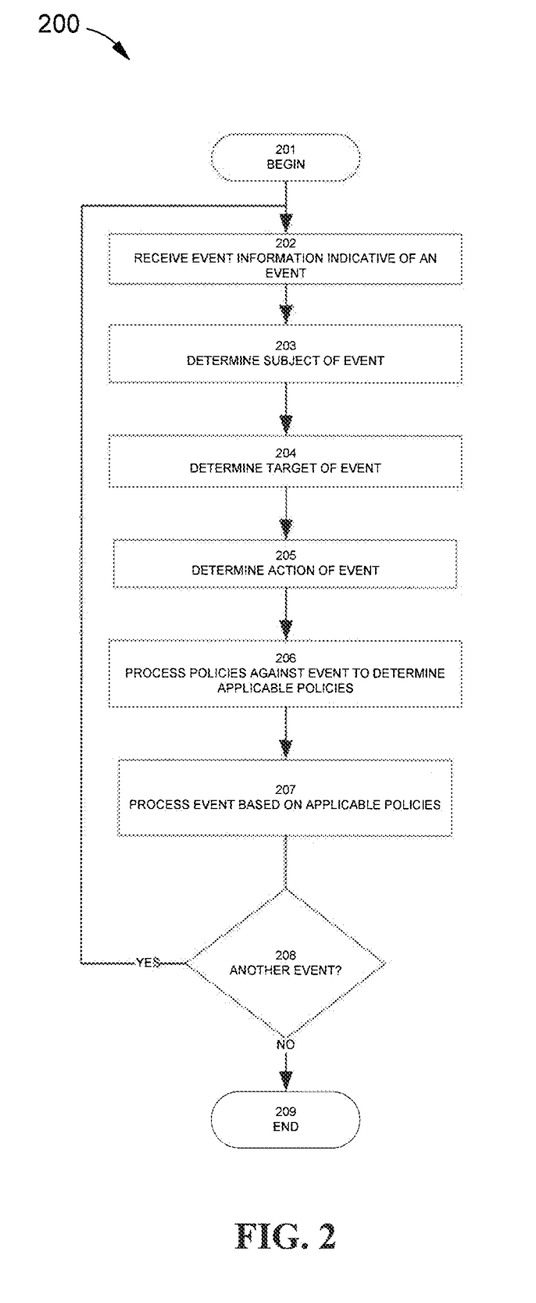
FIG. 2 is a flow chart illustrating an exemplary operation of applying a policy to an event in the policy-based electronic transaction system of FIG. 1.

FIG. 2 is a flow chart illustrating an exemplary operation of dynamically applying a policy to an event in the policy-based electronic transaction system 100 of FIG. 1. The process 200 proceeds from beginning step 201 to step 202 in which event information indicative of an event is received, such as from a PEP by the policy system 100. In certain embodiments, the event information comprises a subject value, target value, and action value. In certain embodiments, the event information further comprises a value indicating the PEP at which the event occurred, the time at which the event occurred, and a value indicating an initiator of the event.

In step 203, a subject of the event is determined, in step 204, the target of the event is determined, and in step 205, the action of the event is determined, such as by the policy system's 100 processing of the event information. In step 206, existing policies (e.g., from the policy information store 122) are processed against the event (including the subject, e.g., from the user information store 124) to determine which policies, if any, are applicable to the event. The event is then processed based on the applicable policies in step 207. If at least one more event remains to be processed, as determined in decision step 208, the process 200 returns to step 202, otherwise the process 200 ends in step 209.

Having set forth in FIG. 2 a process 200 by which a policy is applied to an event in the policy-based electronic transaction system 100 of FIG. 1, several examples will now be presented using the process 200 of FIG. 2 and various different users and PEPs.

In a first example, the user is an instructor 110 (e.g., a user that holds an instructor-level position at an institution, and accordingly is associated with instructor-type policies in the policy system 100) attempting to access a PEP that is an electronically restricted access door 112, as illustrated in FIG. 1. The process 200 proceeds from beginning step 201 to step 202 in which, after the instructor 110 provides identification data to the electronically restricted access door 112, e.g., by swiping an identification card through a card reader 128 of the electronically restricted access door 112, event information comprising the identification data is received by the policy system 100 from the electronically restricted access door 112. In steps 203-205, the policy system 100 determines the instructor 110 is the subject of the event, the target is the electronically restricted access door 112, and the action is the instructor 110 seeking to gain access through the electronically restricted access door 112. In step 206, the processor 118 of the policy system 100 processes the policy information store 122 to determine which policies, if any, are applicable to the event. In step 207, the processor 118 determines that a policy exists indicating that the instructor 110 has access through the electronically restricted access door 112 because the door is for a classroom, and the policy system 100 sends an indication to the electronically restricted access door 112 to provide access to the instructor 110. If, however, the electronically restricted access door 112 was for another type of room, e.g., a dormitory room, the instructor 110 may not have had access based on the applicable policies. No more events remain to be processed in step 208, so the process 200 ends in step 209.

In a second example, the user is a student 102 (e.g., a user that holds a student-level position at an institution, and accordingly is associated with student-type policies in the policy system 100) attempting to access a PEP that is a cash register 104. The process 200 proceeds from beginning step 201 to step 202 in which, after the student 102 attempts to purchase a textbook from the cash register operator at the cash register 104, event information comprising the purchase request is received by the policy system 100 from the cash register 104. In steps 203-205, the policy system 100 determines the student 102 is the subject of the event, the target is the textbook, and the action is the student 102 seeking to purchase the textbook. In step 206, the processor 118 of the policy system 100 processes the policy information store 122 to determine which policies, if any, are applicable to the event. In step 207, the processor 118 determines that one policy related to the event exists, and that policy indicates that the student 102 has access to purchase the textbook at the cash register 104, so the policy system 100 sends an indication to the cash register 104 to allow the student 102 to purchase the textbook. No more events remain to be processed in step 208, so the process 200 ends in step 209.

In a third example, related to the second example, the user is a student 102, on the honor roll, at the institution attempting to purchase the same textbook at the same cash register 104. Jumping immediately to step 207 of the second example, the processor 118 determines that two policies related to the event exist: a first policy that indicates the student 102 has access to purchase the textbook at the cash register 104, and a second policy that indicates that any student on the honor roll receives an order-line price discount of 5% on purchases. Consequently, in the same step 207 the policy system 100 sends an indication to the cash register 104 to allow the student 102 to purchase the textbook and to give the student 102 a 5% discount on the purchase. No more events remain to be processed in step 208, so the process 200 ends in step 209.

In a fourth example, related to the second and third examples, the user is both a student 102 and a teacher's assistant who is on the honor roll at the institution, attempting to purchase an answer key at the same cash register 104. The process 200 proceeds from beginning step 201 to step 202 in which, after the student 102 attempts to purchase an answer key from the cash register operator, event information comprising the purchase request is received by the policy system 100 from the cash register 104. In steps 203-205, the policy system 100 determines the student 102 is the subject of the event, the target is the answer key, and the action is the student 102 seeking to purchase the answer key. In step 206, the processor 118 of the policy system 100 processes the policy information store 122 to determine which policies, if any, are applicable to the event. In step 207, the processor 118 determines that three policies related to the event exist: a first policy that indicates students generally do not have access to purchase answer keys at the cash register 104, a second policy superseding the first policy that indicates teacher's assistants have access to purchase answer keys at the cash register 104, and a third policy that indicates that any student on the honor roll receives an order-line price discount of 5% on purchases. Consequently, in the same step 207 the policy system 100 sends an indication to the cash register 104 to allow the student 102 to purchase the answer key and to give the student 102 a 5% discount on the purchase. If, however, the student 102 were not a teacher's assistant (e.g., the second policy was not associated with the student), the student 102 would not have been able to purchase the answer key. No more events remain to be processed in step 208, so the process 200 ends in step 209.

In a fifth example, the user is a student 102 attempting to purchase an alcoholic beverage at the same cash register 104. The process 200 proceeds from beginning step 201 to step 202 in which, after the student 102 attempts to purchase the alcoholic beverage from the cash register operator, event information comprising the purchase request is received by the policy system 100 from the cash register. In steps 203-205, the policy system 100 determines the student 102 is the subject of the event, the target is the alcoholic beverage, and the action is the student 102 seeking to purchase the alcoholic beverage. In step 206, the processor 118 of the policy system 100 processes the policy information store 122 to determine which policies, if any, are applicable to the event. In step 207, the processor 118 determines that three policies related to the event exist: a first policy that indicates students do not have access to purchase alcoholic beverages at the cash register 104 unless an exception exists, a second policy indicating one such exception where alcoholic beverages may only be purchased at a supervised location, and a third policy indicating another exception where alcoholic beverages may only be purchased on certain dates at certain times at the supervised locations (e.g., when an administered transport is available to transport students with alcohol to the local sports game). Consequently, in the same step 207, after the policy system has determined the cash register 104 is not located at a supervised location, the policy system 100 sends an indication to the cash register 104 to refuse the student's 102 request to purchase the alcoholic beverage. No more events remain to be processed in step 208, so the process 200 ends in step 209.

In a sixth example, the user is an alumnus 110 (e.g., a user that holds an alumni-level position at an institution, and accordingly is associated with alumni-type policies in the policy system 100) attempting to access a PEP that is a terminal 108, as illustrated in FIG. 1. This example demonstrates a policy that provides variability in the implementation of an electronic system across an organization based on different preferences and/or requirements within that organization. The process 200 proceeds from beginning step 201 to step 202 in which, after the alumnus 106 attempts to access a website of the institution at the terminal 108, e.g., by logging in to the alumni website for the institution using the terminal 108, event information comprising the alumnus' 106 access request is received by the policy system 100 from the terminal 108. In steps 203-205, the policy system 100 determines the alumnus 106 is the subject of the event, the target is the institution website, and the action is the alumnus 106 seeking to gain access to the institution website. In step 206, the processor 118 of the policy system 100 processes the policy information store 122 to determine which policies, if any, are applicable to the event. In step 207, the processor 118 determines that two policies exist that are applicable to the event: a first policy indicating that a prompt should be provided to the alumnus 106 to allow the alumnus to input his year of graduation, and a second policy indicating the visual theme (e.g., colors and fonts) used for the website interface. The visual theme policy can be based on the preferences or requirements of the organization administering the policy system 100. In the same step 207, the policy system 100 sends an indication to the terminal 108 to render the website interface to both include the prompt allowing the alumnus 106 to input his year of graduation, and display the interface in the selected visual theme. No more events remain to be processed in step 208, so the process 200 ends in step 209.

Figure 3A:
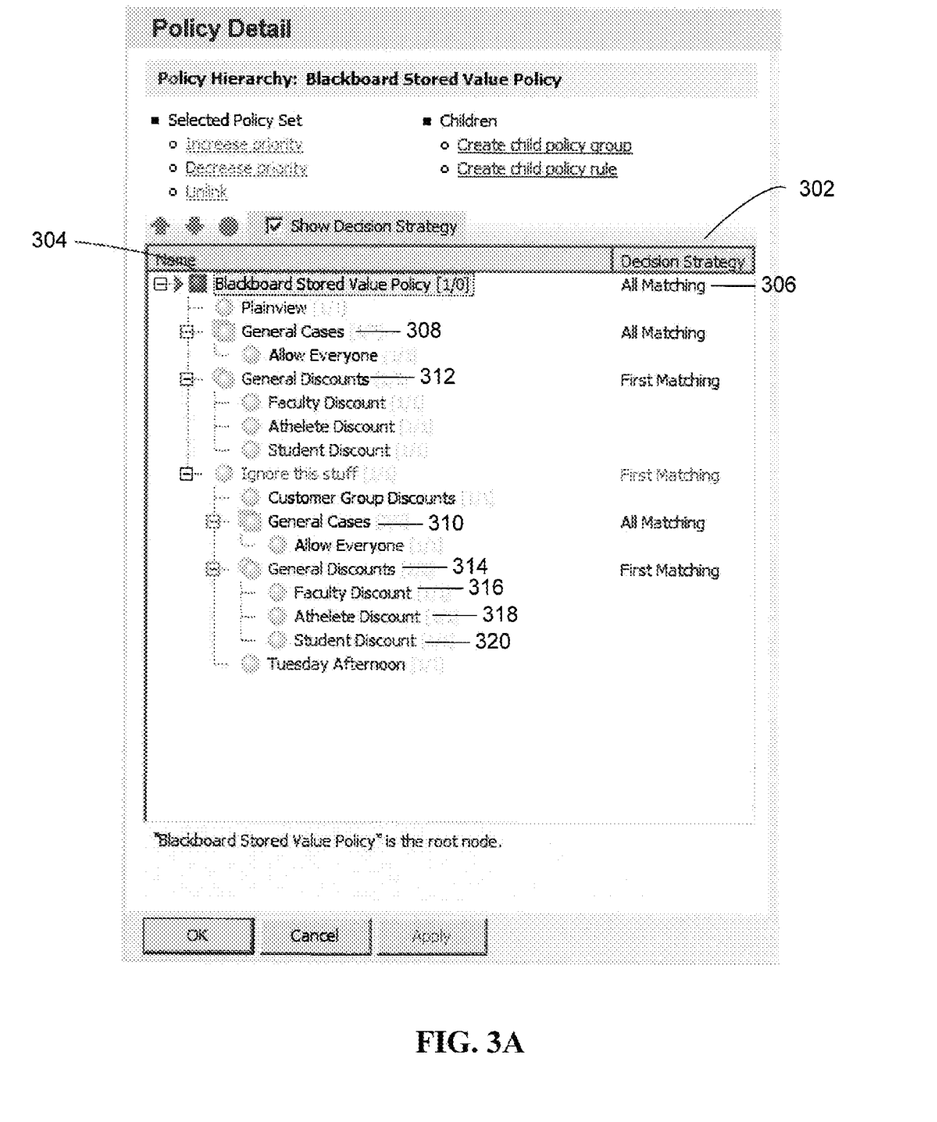
FIGS. 3A-3B are sample screenshots illustrating user interfaces for configuring policies for use with the policy-based electronic transaction system of FIG. 1.
Figure 3B:
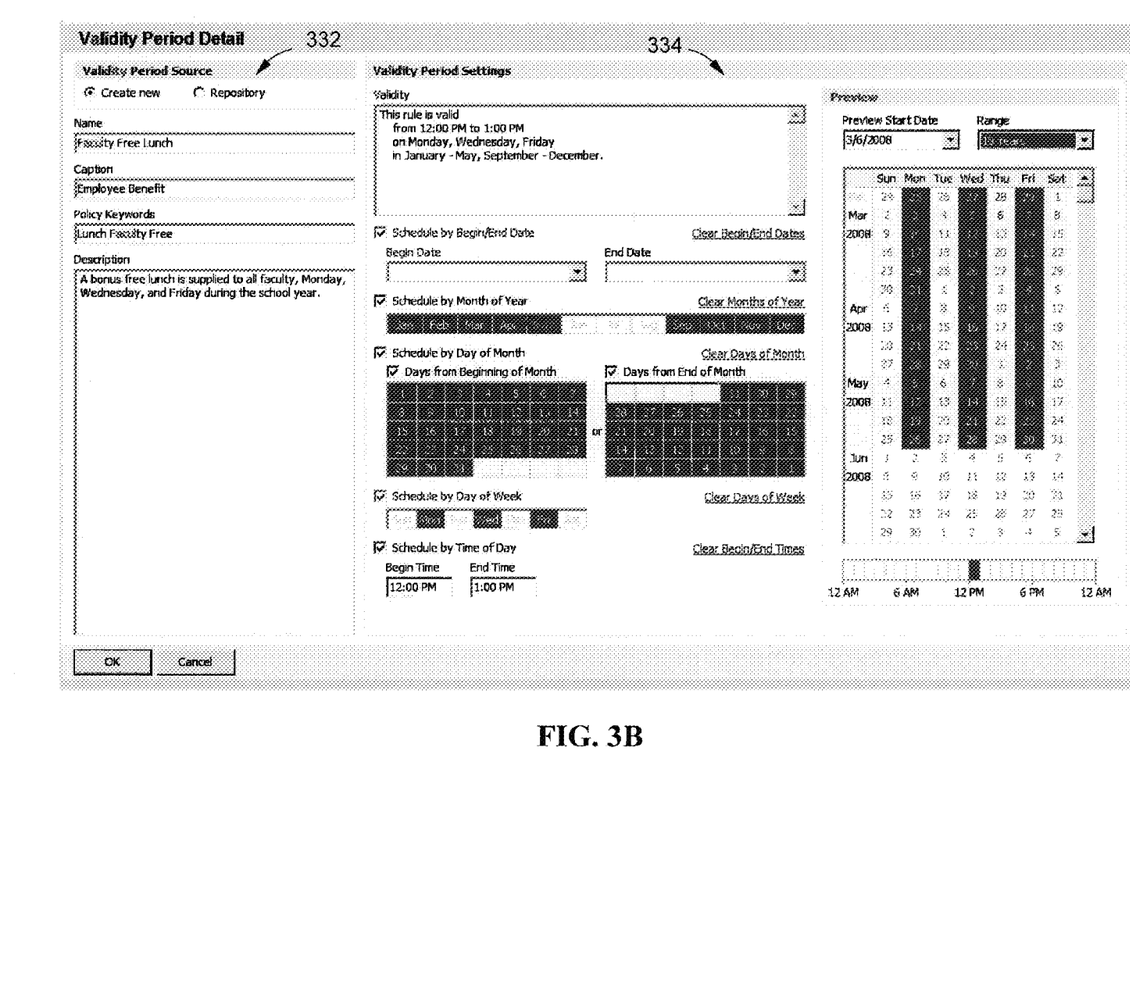

FIGS. 3A-3B are sample screenshots illustrating exemplary user interfaces for configuring policies for use with the policy-based electronic transaction system 100 of FIG. 1. FIG. 3A is a sample screenshot illustrating a user interface in which existing policy rules (e.g., from policy information store 122) can be viewed and configured, according to certain embodiments.

In the illustrated embodiment, each illustrated policy rule has a decision strategy 302. A "first matching" decision strategy indicates that child policy rules in the level immediately below the selected policy rule are evaluated until a first child policy rule is found whose conditions are satisfied, and then the action associated with the first child policy rule is taken. An "all matching" decision strategy indicates that all child policy rules in the level immediately below the selected policy rule are evaluated, and actions associated with any child policy rules whose conditions were satisfied are taken.

In the illustrated embodiment, each illustrated policy rule can include a validity period, condition, and action. The validity period of a policy rule indicates the valid time frame of the rule, such as for several minutes or indefinitely. FIG. 3B is a sample screenshot illustrating a user interface for setting the validity period of a policy rule, according to certain embodiments. The user interface includes an area 332 for describing the validity period of the policy rule, and an area 334 for defining the validity period of the policy rule. Specifically, the illustrated policy rule validity period is named "Faculty Free Lunch," and is described as providing a "bonus free lunch" to faculty on certain days of the school year. The days are defined in the validity period settings area 334, which defines the policy rule validity period as being valid from 12:00 PM to 1:00 PM on Mondays, Wednesdays, and Fridays from January to May and September to December.

The condition of a policy rule indicates how the rule is validated against specific criteria. Example conditions include a "customer in group" condition, in which the condition is valid only if the subject (e.g., customer or PEP) involved in the transaction is a member of a certain group, a tender condition, in which the condition requires a specified tender to be used in the transaction, and a time period condition, requiring the transaction to take place during a certain time period. Multiple conditions can be defined for each policy rule. Each condition can be linked to another condition, such as by positive linking (e.g., 'and/or' connector) or negative linking (e.g., 'not' connector). Conditions may be divided into sub-conditions.

The action of a policy rule indicates the instruction(s) to be executed by the policy rule, such as determining the result of a retail transaction. Exemplary action types include "deny transaction," "allow transaction," "apply discount," "apply surcharge," and "debit/credit store value." Deny transaction action types indicate policy rules in which transactions meeting specified conditions are denied. Allow transaction action types indicate policy rules in which transactions meeting specified conditions are allowed to succeed. Apply discount action types indicate policy rules in which transactions meeting specified conditions are provided a discount, e.g., a discount in purchase price. Apply surcharge action types indicate policy rules in which transactions meeting specified conditions are provided a surcharge, e.g., an increase in purchase price. Debit/credit store value action types indicate policy rules in which a specified account should be debited or credited (and in the case of multiple accounts, the order in which those accounts are debited or credited) because of a transaction.

Returning to FIG. 3A, the Blackboard Stored Value Policy node 304 is a policy rule root node, i.e., a top level policy rule node that sets the decision strategy for a policy rule subordinate/child node. For example, the Blackboard Stored Value Policy rule root node 304 sets the decision strategy to be "all matching" 306 for its policy rule child nodes, such that each policy rule child node of the Blackboard Stored Value Policy rule root node 304 is evaluated and actions from policy rule child nodes having satisfied conditions are combined and executed. Each of the General Cases policy rule nodes 308 and 310 and General Discounts policy rule nodes 312 and 314 are policy rule parent nodes, i.e., they are secondary level policy rule nodes that are associated with the policy rule root node 304 or another policy rule parent node. A policy rule parent node 308, 310, 312, and 314 sets the decision strategy for its policy rule child nodes. For example, the General Discounts policy rule parent node 314 evaluates each of the Faculty Discount policy rule child node 316, Athlete Discount policy rule child node 318, and Student Discount 320 policy rule child node for the first policy rule child node whose conditions are satisfied, and then executes the action of that satisfied policy rule child node.

Figure 4:
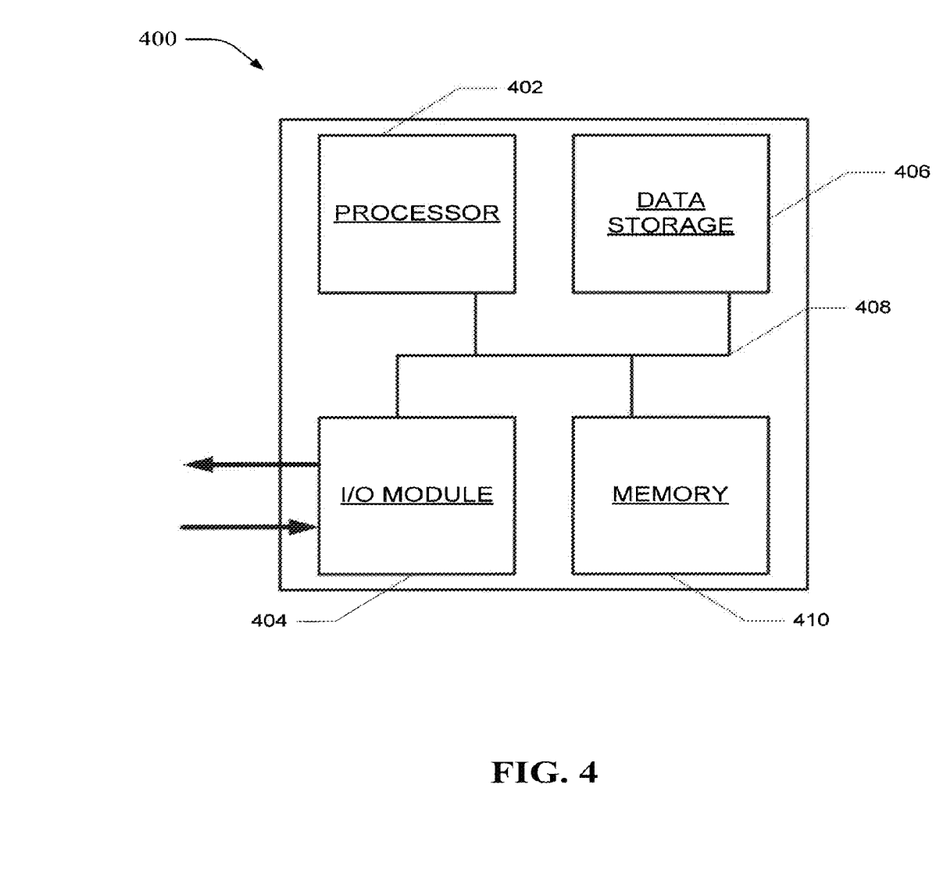
FIG. 4 is a block diagram illustrating an example of a computer system with which the policy-based electronic transaction system of FIG. 1 can be implemented.

FIG. 4 is a block diagram that illustrates a computer system 400 upon which an embodiment of the present disclosure may be implemented in accordance with one aspect of the present disclosure. In certain embodiments, computer system 400 can be used to implement policy system 100 from FIG. 1. In certain embodiments, the computer system 400 may be implemented using software, hardware, or a combination of both, either in a dedicated server, or integrated into another entity, or distributed across multiple entities. In certain embodiments, policies may be implemented according to any method well known to those of skill in the art, including computer languages such as the Ponder Policy Specification Language.

Computer system 400 includes a bus 408 (e.g., communications bus 126 from FIG. 1) or other communication mechanism for communicating information, and a processor 402 (e.g., processor 118 from FIG. 1) coupled with bus 408 for processing information. By way of example, the computer system 400 may be implemented with one or more processors 402. Processor 402 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information. Computer system 400 also includes a memory 410 (e.g., memory 120 from FIG. 1), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 408 for storing information and instructions to be executed by processor 402. The instructions may be implemented according to any method well known to those of skill in the art, including computer languages such as system languages (e.g., C, C++, Assembly), architectural languages (e.g., Java), and application languages (e.g., PHP, Ruby, Perl, Python). Memory 410 may also be used for storing temporary variable or other intermediate information during execution of instructions to be executed by processor 402. Computer system 400 further includes a data storage device 406, such as a magnetic disk or optical disk, coupled to bus 408 for storing information and instructions.

Computer system 400 may be coupled via I/O module 404 to a display device, such as a cathode ray tube ("CRT") or liquid crystal display ("LCD") for displaying information to a computer user. An input device, such as, for example, a keyboard, or a mouse may also be coupled to computer system 400 via I/O module 404 for communicating information and command selections to processor 402.

According to one aspect of the present disclosure, the application of multiple policies associated with different access levels to a user based upon the changing access level needs and profile of the user may be implemented using a computer system 400 in response to processor 402 executing one or more sequences of one or more instructions contained in memory 410. Such instructions may be read into memory 410 from another machine-readable medium, such as data storage device 406. Execution of the sequences of instructions contained in main memory 410 causes processor 402 to perform the process steps described herein. One or more processors in a multi-processing arrangement may also be employed to execute the sequences of instructions contained in memory 410. In alternative embodiments, hard-wired circuitry may be used in place of or in combination with software instructions to implement various embodiments of the present disclosure. Thus, embodiments of the present disclosure are not limited to any specific combination of hardware circuitry and software.

The term "machine-readable medium" as used herein refers to any medium or media that participates in providing instructions to processor 402 for execution. Such a medium may take many forms, including, but not limited to, non-volatile media, volatile media, and transmission media. Non-volatile media include, for example, optical or magnetic disks, such as data storage device 406. Volatile media include dynamic memory, such as memory 406. Transmission media include coaxial cables, copper wire, and fiber optics, including the wires that comprise bus 408. Transmission media can also take the form of acoustic or light waves, such as those generated during radio frequency and infrared data communications. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

The embodiments of the present disclosure provide a system in which user transactions are processed according to and based on policies that are applicable to the user and/or the transaction, thereby allowing multiple policies to be dynamically associated with users based on those users' changing access levels and needs.

Those of skill in the art would appreciate that the various illustrative blocks, modules, elements, components, methods, and algorithms described herein may be implemented as electronic hardware, computer software, or combinations of both. Furthermore, these may be partitioned differently than what is described. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application.

It is understood that the specific order or hierarchy of steps or blocks in the processes disclosed is an illustration of exemplary approaches. Based upon design preferences, it is understood that the specific order or hierarchy of steps or blocks in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A system for processing electronic transactions according to policies, comprising:
 a user module configured to store computer-readable information related to at least one user;
 a policy module configured to store a plurality of policies for electronic transactions, wherein each policy for an electronic transaction comprises a subject value, target value, and action value, and wherein each policy also comprises at least one of an authorization or an obligation policy; and
 a processor configured to receive a request by the at least one user to access a physical space or be authorized to purchase an available item, and configured to dynamically compare, upon receipt of the request by the processor, the subject value, the target value, and the action value of each of the plurality of policies for the electronic transactions to the request by the at least one user to determine whether at least one of the plurality of policies applies to the request by the at least one user to access the physical space or be authorized to purchase the available item,
 wherein the subject value comprises an identification of the at least one user, the target value comprises an identification of the physical space or available item, and the action value comprises the request to access the physical space or the request to be authorized to purchase the available item, and
 wherein each of the plurality of policies is configured to apply to a plurality of users.

2. The system of claim 1, wherein determining whether at least one of the plurality of policies applies to the request by the at least one user comprises determining whether to provide, to the at least one user, access to the physical space or access to purchase the available item.

3. The system of claim 1, further comprising a communications module configured to communicate with a policy execution point device (PEP), wherein the communications module is configured to communicate an indication to the PEP indicating whether to provide, to the at least one user, access to the physical space or item based on the application of the plurality of policies to the at least one user.

4. The system of claim 1,
wherein the plurality of policies for the electronic transactions further comprise an obligation regarding access to a physical space or item by the at least one user, and
wherein the processor is further configured to receive a command for the at least one user to complete the electronic transaction, and configured to apply the at plurality of policies to the at least one user based on the command to complete the electronic transaction.

5. The system of claim 4, further comprising a communications module configured to communicate to the at least one user a message indicating the command for the at least one user to complete the electronic transaction.

6. The system of claim 1, wherein the user module is configured to store information related to a plurality of users.

7. A system for processing electronic transactions according to policies, comprising:
a user module configured to store computer-readable information related to at least one user;
a policy module configured to store a plurality of policies for electronic transactions, wherein each policy for an electronic transaction comprises a subject value, target value, and action value; and
a processor configured to receive a request by the at least one user to be authorized to purchase an available item, and configured to dynamically compare, upon receipt of the request by the processor, the subject value, the target value, and the action value of each of the plurality of policies for electronic transactions to the request by the at least one user to determine whether at least one of the plurality of policies applies to the request by the at least one user to be authorized to purchase the available item,
wherein the subject value comprises an identification of the at least one user, the target value comprises an identification of the available item, and the action value comprises the request to be authorized to purchase the available item,
wherein each of the plurality of policies is configured to apply to a plurality of users, and
wherein determining whether at least one of the plurality of policies applies to the request by the at least one user comprises determining for the at least one user the price and authorization to purchase the available item.

8. The system of claim 7, wherein determining the price and availability of the item for the at least one user comprises determining whether to provide, to the at least one user, an adjustment to a value of the item.

9. The system of claim 7, wherein determining the price and availability of the item for the at least one user comprises determining whether the at least one user has the access to purchase the item.

10. The system of claim 7, further comprising a communications module configured to communicate with a policy execution point device (PEP), wherein the communications module is configured to communicate an indication to the PEP indicating at least one of a value of the item to the at least one user, or the availability of the item to the at least one user, based on the application of the plurality of policies to the at least one user.

11. A system for processing electronic transactions according to policies, comprising:
a user module configured to store computer-readable information related to at least one user;
a policy module configured to store a plurality of policies for electronic transactions, wherein each policy for an electronic transaction comprises a subject value, target value, and action value, and wherein each policy comprises at least one of an authorization or an obligation policy; and
a processor configured to receive at least one of a request from the at least one user to complete an electronic transaction, or a command for the at least one user to complete an electronic transaction, indicating a change in at least a displayable portion of an electronic educational user interface of an application between the system and the at least one user at a policy execution point (PEP), and configured to dynamically compare, upon receipt by the processor of the request to complete the electronic transaction or command to complete the electronic transaction, the subject value, the target value, and the action value of each of the plurality of policies for electronic transactions to the request or the command by the at least one user to determine whether to change the displayable portion of the electronic educational user interface of the application,
wherein the subject value comprises an identification of the at least one user, the target value comprises an identification of the application, and the action value comprises the request or the command, and
wherein each of the plurality of policies is configured to apply to a plurality of users.

12. The system of claim 11, wherein for each policy:
the subject value is configured to indicate a subject;
the action value is configured to indicate an action performed by the subject; and
the target value is configured to indicate a target associated with the action by the subject.

13. The system of claim 11, wherein the authorization policy comprises at least one of a permission or a prohibition.

14. The system of claim 11, wherein the obligation policy comprises a refrain policy.

15. The system of claim 11, further comprising a communications module configured to communicate with the PEP, wherein the communications module is configured to communicate an indication to the PEP indicating a change in the electronic educational user interface based on the application of the plurality of policies to the at least one user.

16. A method for processing electronic transactions according to policies, comprising:
receiving at least one of a request from at least one user to complete an electronic transaction comprising a subject value, target value, and action value, or a command for the at least one user to complete the electronic transaction, the electronic transaction comprising changing at least a displayable portion of an electronic educational user interface of an application displayed to the at least one user; and
dynamically comparing, upon receipt of the request or the command to complete the electronic transaction, the subject value, the target value, and the action value of each of a plurality of policies for electronic transactions to the request or the command to determine whether to change the at least a displayable portion of the electronic educational user interface, wherein the subject value comprises an identification of the at least one user, the target value comprises an identification of the application, and the action value comprises the request or command to change the at least a displayable portion of the electronic educational user interface of the application, and wherein each of the plurality of policies is configured to apply to a plurality of users and comprises at least one of an authorization or an obligation policy.

17. The method of claim 16, further comprising indicating, to the at least one user, a result of the application of the plurality of policies to the at least one user.

18. A non-transitory machine-readable medium encoded with instructions for processing electronic transactions according to policies, the instructions comprising code for:

receiving at least one of a request from at least one user to complete an electronic transaction comprising a subject value, target value, and action value, or a command for the at least one user to complete the electronic transaction, the electronic transaction comprising changing at least a displayable portion of an electronic educational user interface of an application displayed to the at least one user; and dynamically comparing, upon receipt of the request or the command to complete the electronic transaction, the subject value, the target value, and the action value of each of a plurality of policies for electronic transactions to the request or the command to determine whether to change the at least a displayable portion of the electronic educational user interface, wherein the subject value comprises an identification of the at least one user, the target value comprises an identification of the application, and the action value comprises the request or command to change the at least a displayable portion of the electronic educational user interface of the application, and wherein each of the plurality of policies is configured to apply to a plurality of users and comprises at least one of an authorization or an obligation policy.

19. A system for processing electronic transactions according to policies, comprising:

a user module configured to store computer-readable information related to at least one user;

a policy module configured to store a plurality of policies for electronic transactions, wherein each policy for an electronic transaction comprises a subject value, target value, and action value indicating a permission to access a physical space by a user, and wherein each policy comprises at least one of an authorization or an obligation policy; and a processor configured to receive a request to access a physical space by the at least one user, and configured to dynamically compare, upon receipt of the request by the processor, the subject value, the target value, and the action value of each of the plurality of policies for the electronic transactions to the request by the at least one user to determine whether at least one of the plurality of policies applies to the request by the at least one user to access the physical space, wherein the subject value comprises an identification of the at least one user, the target value comprises an identification of the physical space, and the action value comprises the request to access the physical space, wherein each of the plurality of policies is configured to apply to a plurality of users.

\* \* \* \* \*